(12) United States Patent
Weintraub

(10) Patent No.: US 12,597,052 B1
(45) Date of Patent: Apr. 7, 2026

(54) SYSTEM AND METHOD FOR PROVIDING PRIVACY-LAW COMPLIANT CONSUMER-PATIENT INFORMATION FOR TARGET ONLINE MARKETING

(71) Applicant: OptimizeRx Corporation, Waltham, MA (US)

(72) Inventor: Michael D. Weintraub, Scottsdale, AZ (US)

(73) Assignee: OptimizeRx Corporation, Waltham, MA (US)

( * ) Notice: Subject to any disclaimer, the term of this patent is extended or adjusted under 35 U.S.C. 154(b) by 408 days.

(21) Appl. No.: 18/117,045

(22) Filed: Mar. 3, 2023

(51) Int. Cl.
    *G06Q 30/02* (2023.01)
    *G06Q 30/0204* (2023.01)
    *G06Q 30/0241* (2023.01)

(52) U.S. Cl.
    CPC ..... *G06Q 30/0277* (2013.01); *G06Q 30/0205* (2013.01)

(58) Field of Classification Search
    CPC .................................................... G06Q 30/02
    See application file for complete search history.

(56) References Cited

U.S. PATENT DOCUMENTS

| | | | |
|---|---|---|---|
| 8,521,594 B1 | 8/2013 | Skoe et al. | |
| 10,559,009 B1 * | 2/2020 | Kingman, Jr. ..... | G06Q 30/0269 |
| 10,861,053 B1 * | 12/2020 | Feininger ........... | G06Q 30/0269 |
| 11,521,746 B1 | 12/2022 | Weintraub | |

| | | | |
|---|---|---|---|
| 2008/0294503 A1 * | 11/2008 | Borislow ........... | G06Q 30/0256 |
| | | | 705/14.54 |
| 2012/0278098 A1 | 11/2012 | Vovan et al. | |
| 2013/0054346 A1 | 2/2013 | Sekura | |
| 2013/0073388 A1 * | 3/2013 | Heath .................... | G06Q 50/01 |
| | | | 705/14.53 |
| 2013/0339052 A1 | 12/2013 | Neff | |
| 2014/0324447 A1 * | 10/2014 | Dittus ................ | G06Q 30/0269 |
| | | | 705/2 |
| 2016/0112522 A1 * | 4/2016 | Abello .................... | H04L 67/02 |
| | | | 709/224 |
| 2017/0053318 A1 | 2/2017 | Cullen et al. | |
| 2020/0152339 A1 | 5/2020 | Pulitzer et al. | |
| 2020/0351323 A1 | 11/2020 | Gong et al. | |
| 2022/0270129 A1 | 8/2022 | Dakic et al. | |

* cited by examiner

*Primary Examiner* — Nga B Nguyen
(74) *Attorney, Agent, or Firm* — GTC Law Group PC & Affiliates

(57) ABSTRACT

A method can include receiving, via a computer network, a marketing campaign audience segment file for an online marketing campaign in one or more target geographic areas. The method further can include generating marketing campaign audience internet address data based on the marketing campaign audience segment file. Generating the marketing campaign audience internet address data can include determining a respective household street address for each of respective target households in each of the one or more target geographic areas; and determining a respective household internet address corresponding to the respective household street address based on online website impression logs provided, via the computer network, by one or more online media servers. Further, the method can include transmitting, via the computer network, the marketing campaign audience internet address data to an online campaign server for executing the online marketing campaign. Other embodiments are disclosed.

18 Claims, 7 Drawing Sheets

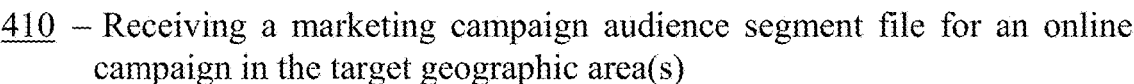

400

410 – Receiving a marketing campaign audience segment file for an online campaign in the target geographic area(s)

420 – Generating marketing campaign audience internet address data based on the marketing campaign audience segment file 4210 – Determining a respective household street address for each of respective target households in each of the target geographic area(s)

4220 – Determining a respective household internet address corresponding to the respective household street address based on online website impression logs provided by the online media server(s)

4221 – Determining a respective household identifier bijectively identifying the respective household street address 4222 – Receiving the respective household internet address from an internet address resolution server 430 – Transmitting, the marketing campaign audience internet address data to an online campaign server for executing the online marketing campaign

Figure 5:
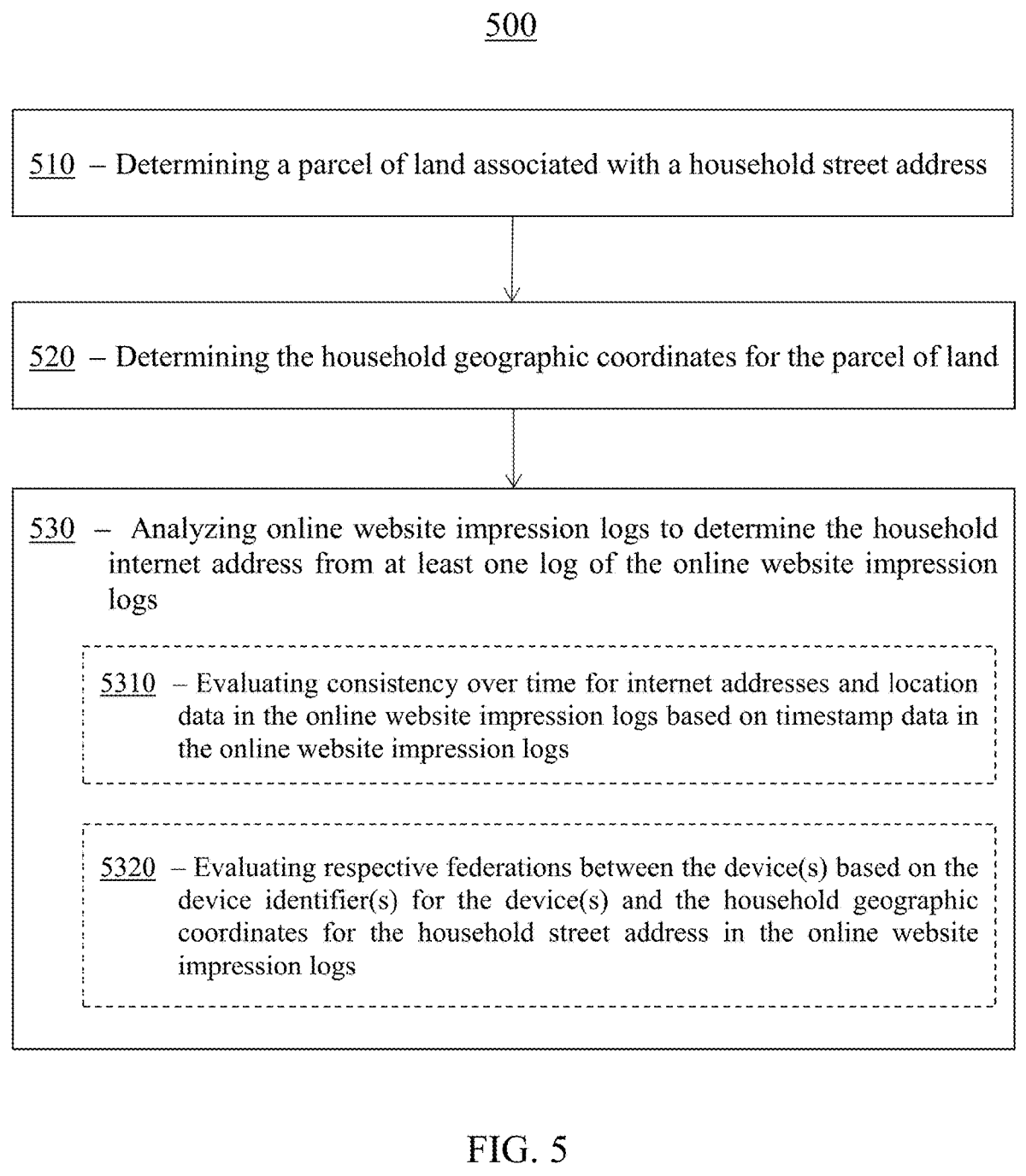

510 – Determining a parcel of land associated with a household street address

520 – Determining the household geographic coordinates for the parcel of land

530 – Analyzing online website impression logs to determine the household internet address from at least one log of the online website impression logs 5310 – Evaluating consistency over time for internet addresses and location data in the online website impression logs based on timestamp data in the online website impression logs 5320 – Evaluating respective federations between the device(s) based on the device identifier(s) for the device(s) and the household geographic coordinates for the household street address in the online website impression logs

<u>610</u> – Determining a respective household identifier bijectively identifying the respective household street address <u>620</u> – Receiving the respective household internet address associated with the respective household identifier from an internet address resolution server configured to provide the respective household internet address determined based on the online website impression logs

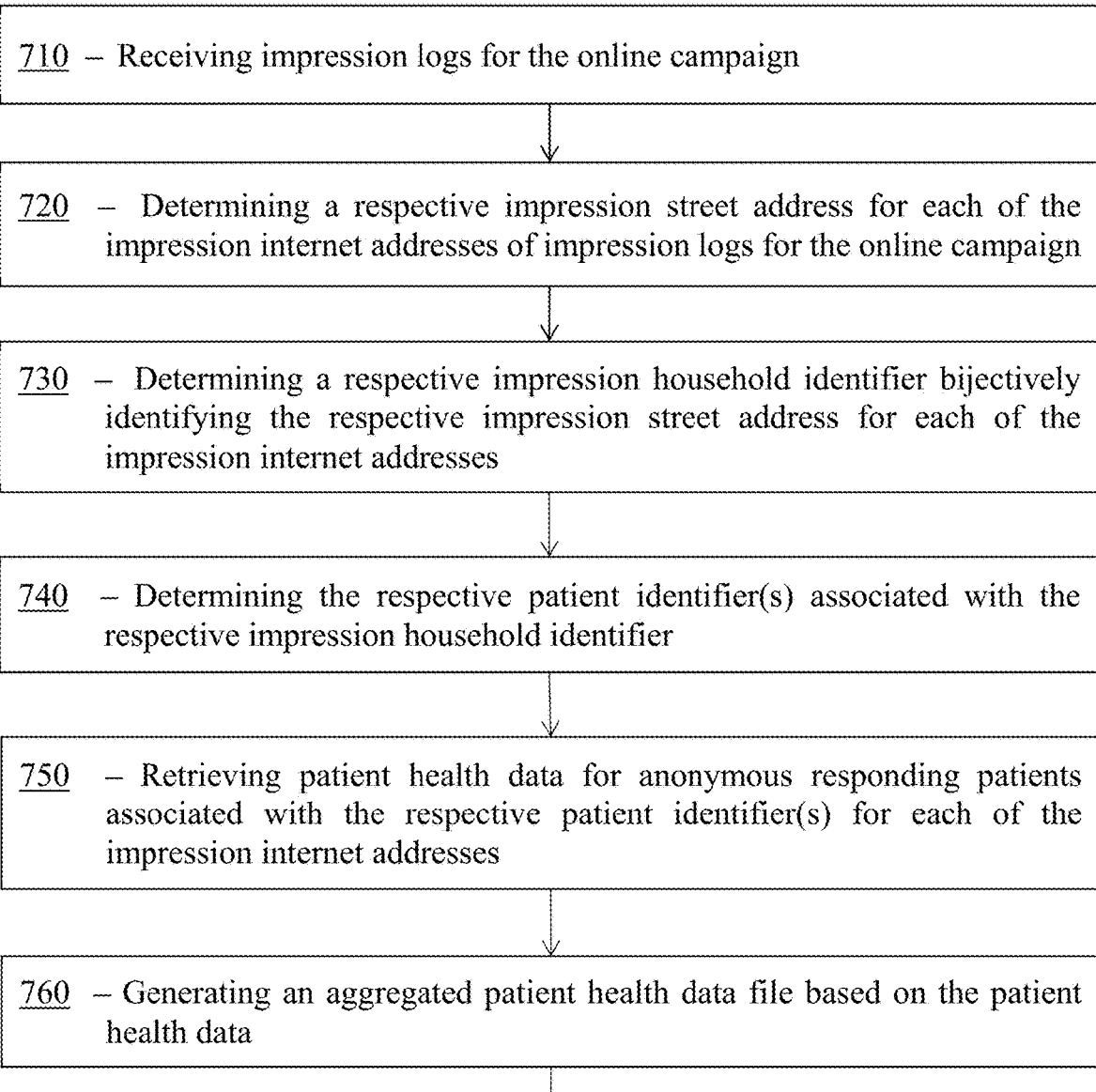

710 – Receiving impression logs for the online campaign

720 – Determining a respective impression street address for each of the impression internet addresses of impression logs for the online campaign 730 – Determining a respective impression household identifier bijectively identifying the respective impression street address for each of the impression internet addresses 740 – Determining the respective patient identifier(s) associated with the respective impression household identifier 750 – Retrieving patient health data for anonymous responding patients associated with the respective patient identifier(s) for each of the impression internet addresses 760 – Generating an aggregated patient health data file based on the patient health data 770 – Transmitting the impression logs and the aggregated patient health data file for the online campaign to a campaign evaluation server for generating performance indications of the online campaign

FIG. 7

SYSTEM AND METHOD FOR PROVIDING PRIVACY-LAW COMPLIANT CONSUMER-PATIENT INFORMATION FOR TARGET ONLINE MARKETING

TECHNICAL FIELD

This disclosure relates generally to techniques for providing privacy-law compliant information for online marketing campaigns.

BACKGROUND

Customer segmentation is an effective tool to target marketing resources. In the field of healthcare, however, various laws and/or regulations prohibit the disclosure of the real identities of target audience. Therefore, systems and methods for providing sufficiently accurate and privacy-law compliant consumer-patient information are desired.

BRIEF DESCRIPTION OF THE DRAWINGS

To facilitate further description of the embodiments, the following drawings are provided in which:

FIG. 4 illustrates a flow chart for a method for determining internet addresses for the online marketing campaign audience based on tokenized consumer-patient information, according to an embodiment;

FIG. 5 illustrates a flow chart for a method for determining a household internet address based on a household street address, according to an embodiment;

FIG. 6 illustrates a flow chart for a method for determining a household internet address based on a household street address, according to another embodiment; and FIG. 7 illustrates a flow chart for a method for linking impression logs for an online marketing campaign to tokenized consumer-patient information for post campaign analysis, according to an embodiment.

Figure 1:
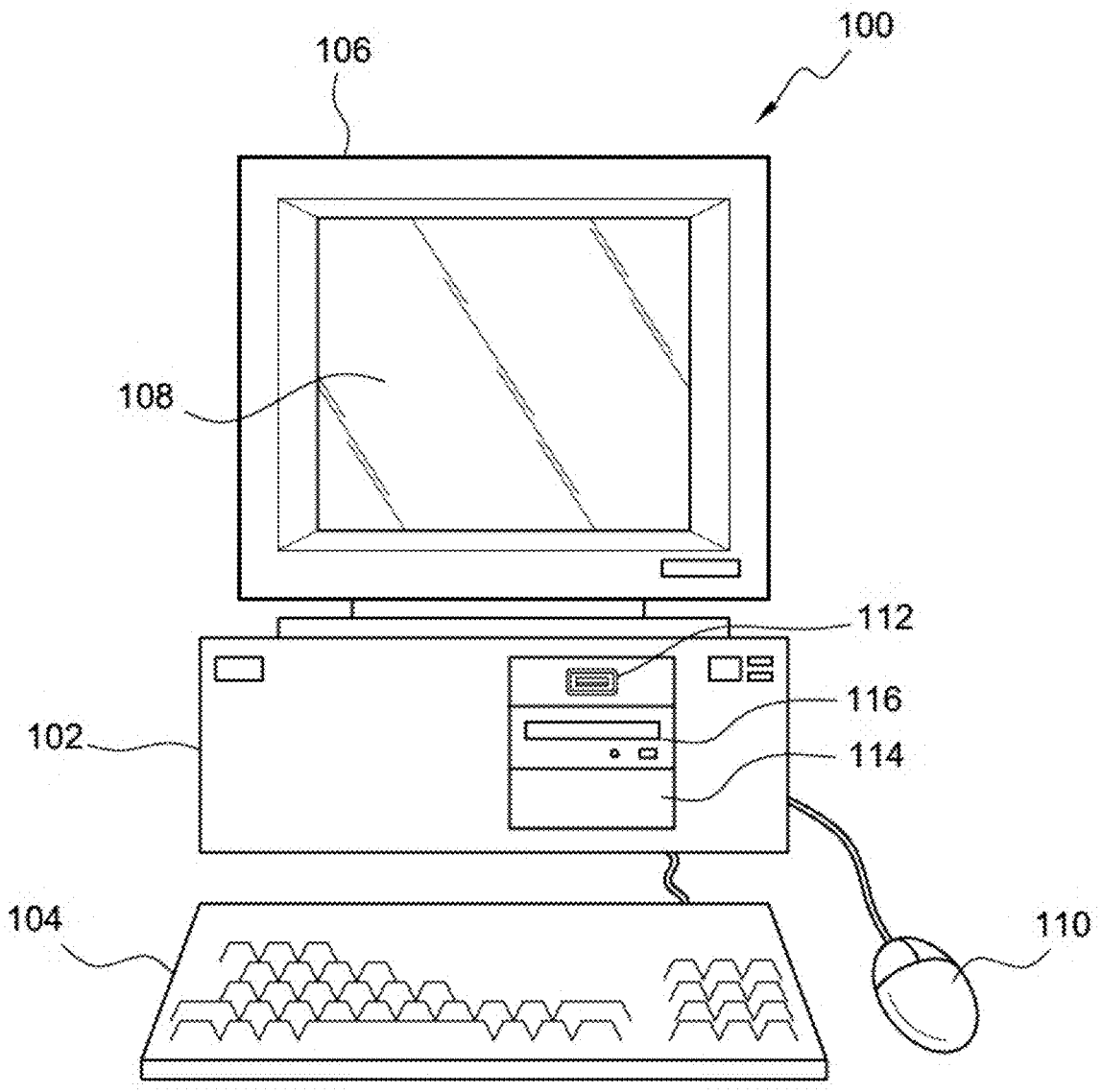
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
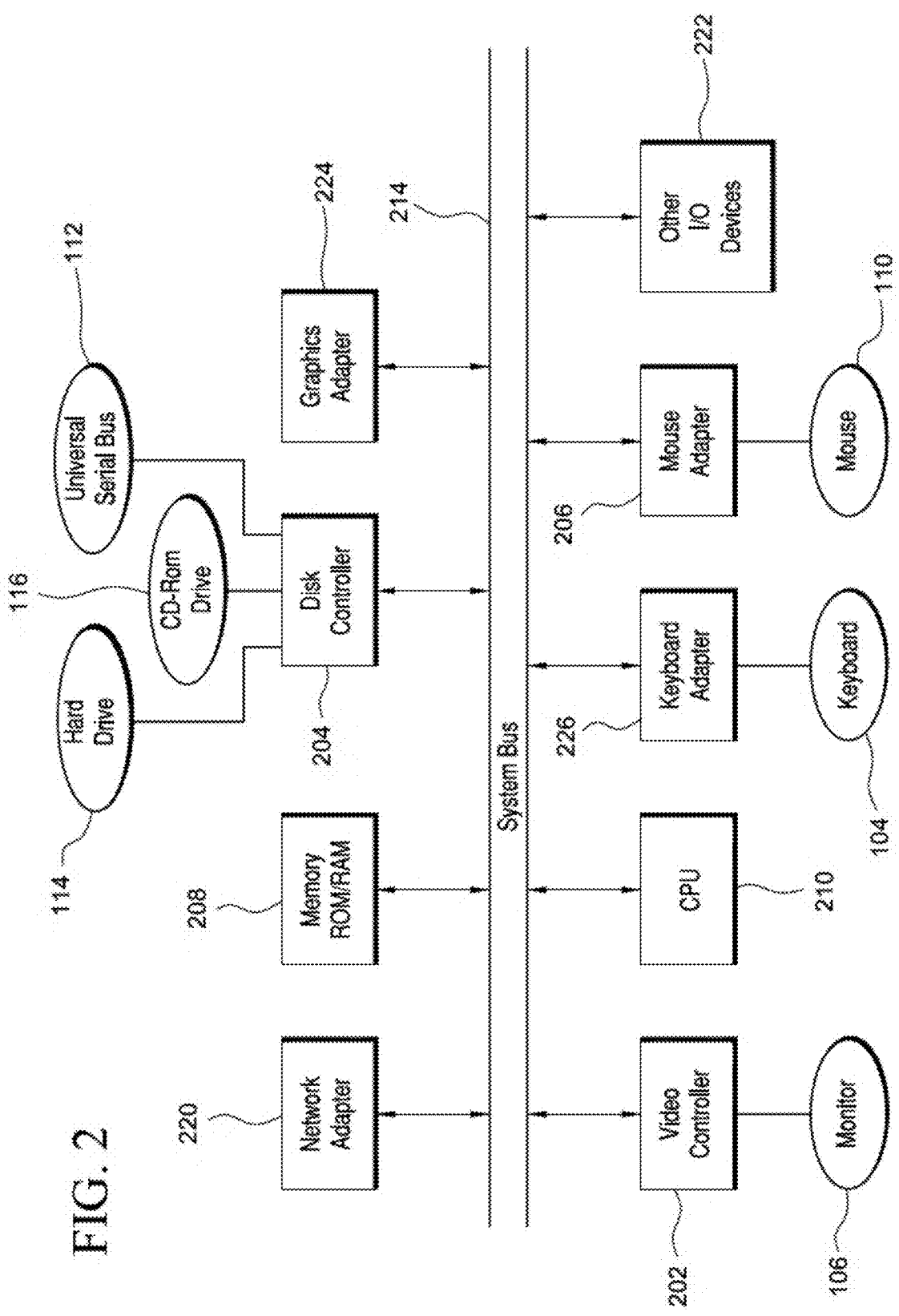
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICS.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such Block as a smartphone. In certain additional embodiments, computer system 100 may comprise an embedded system.

Figure 3:
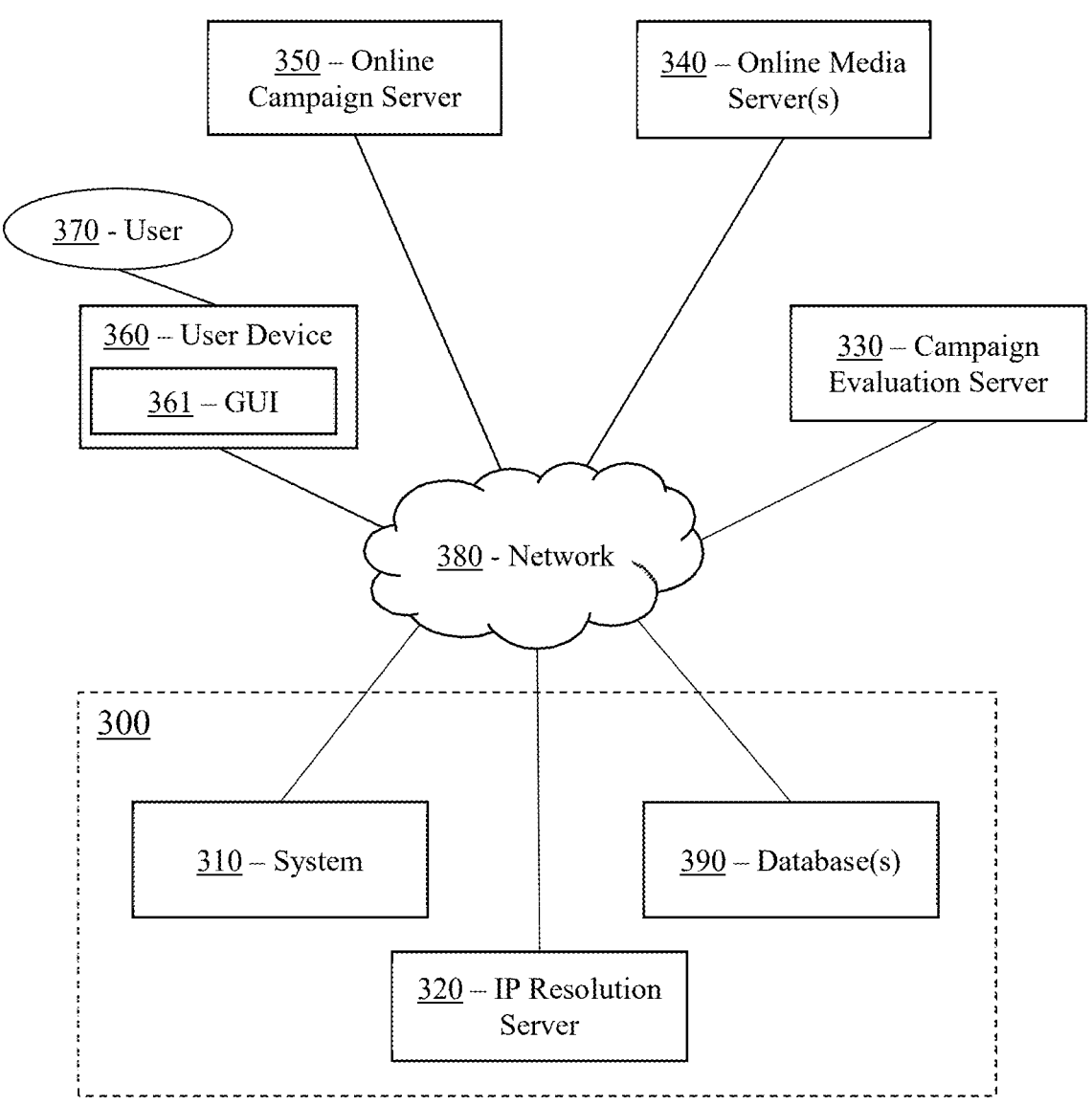
FIG. 3 illustrates a system for linking tokenized consumer-patient information to an advertiser's brand segments for online marketing campaigns and/or for linking impression logs post-campaign analysis, according to an embodiment.

Turning ahead in the drawings, FIG. 3 illustrates a block diagram for a system 300, according to an embodiment. In many embodiments, system 300 can comprise one or more systems (e.g., a system 310 and/or an IP resolution server 320) and/or one or more databases (e.g., a database(s) 390). In a number of embodiments, system 300 or system 310 can map internet addresses of an online marketing campaign audience to and/or from anonymized audience data. The online marketing campaign can include an online advertising campaign for healthcare-related products or services. The audience data can be generated based on medical or prescription claim attributes that are related to the online marketing campaign or are of interest to the advertiser(s) and can be anonymized to protect the privacy of the targeted consumer-patients. In some embodiments, the audience data can be anonymized by any suitable de-identification and/or safe harbor techniques. For example, the safe harbor techniques can include generating hashed or encrypted identifiers (tokens) for each consumer-patient or a consumer-patient's household, micro-neighborhood methods for linking consumer-patient identifiers to 9-digit postal codes, etc.

In a number of embodiments, the internet addresses and/or the anonymized audience segment data provided by or to system 300 or system 310, as well as the generation, transmission, and/or disclosure thereof, can be configured to comply with the privacy laws, regulations, and/or rules of pertinent authorities. Examples of the privacy laws, regulations, and/or rules can include the Health Insurance Portability and Accountability Act (HIPAA) in the United States, the Standards for Privacy of Individually Identifiable Health Information established by the U.S. Department of Health and Human Services (HHS), the General Data Protection Regulation (GDPR) in the European Union, etc.

In many embodiments, the anonymized audience data can include target area identifiers configured to identify target geographic areas where consumer-patients associated with the medical or prescription claim attributes for the online marketing campaign reside. System 300 or system 310 can determine, via an IP resolution server 320, the online marketing campaign audience's internet addresses based on the anonymized audience data. For example, a target area identifier of the anonymized audience data can be a 9-digit postal code (e.g., a ZIP+4 code) for identifying a geographic area (e.g., an area of approximately 1×1 or approximately 2×2 square miles, etc.) of a consumer-patient's residence, and the online marketing campaign audience's internet addresses in the geographic area, as determined by system 300 or 310 based on the anonymized audience data, can include all of the internet addresses in the geographic area.

System 300 or system 310 further can provide the online marketing campaign audience's internet addresses, as determined, to an online campaign server 350. The online campaign server 350 can be hosted by an advertiser and be configured to automatically bid, on behalf of a customer, for online advertisements (e.g., pop-up advertisements, search engine advertisings, etc.) through one or more online media server(s) 340 based on the strategies of the online marketing campaign. The bid(s) can be linked to the online marketing campaign audience's internet addresses so that the online advertisements are to be displayed on user interfaces executed on user devices (e.g., a GUI 361 of a user device 360 for a user 370) bearing the online marketing campaign audience's internet addresses.

In several embodiments, after the online marketing campaign is executed, system 300 or system 310 additionally can receive impression logs for the online marketing campaign from online campaign server 350 and/or online media server(s) 340 for post-campaign analysis. Upon receiving the impression logs, system 300 or system 310 further can determine patient health data for anonymous patients/consumers who responded to or interacted with (e.g., clicked, viewed, shared, etc.) the online marketing campaigns based on the internet addresses of the impression logs. System 300 or system 310 also can transmit the patient health data to a campaign evaluation server 330 for evaluating the effectiveness of the online marketing campaign.

System 300, system 310, IP resolution server 320, campaign evaluation server 330, online media server 340, online campaign server 350, user device 360, and/or database(s) 390 are merely exemplary, and embodiments of system 300, system 310, IP resolution server 320, campaign evaluation server 330, online media server 340, and online campaign server 350 are not limited to the embodiments presented herein. System 300, system 310, IP resolution server 320, campaign evaluation server 330, online media server 340, and online campaign server 350 can be employed in many different embodiments or examples not specifically depicted or described herein. In many embodiments, system 300, system 310, IP resolution server 320, campaign evaluation server 330, online media server 340, and/or online campaign server 350 can comprise one or more suitable systems, subsystems, servers, modules, elements, and/or models.

In some embodiments, certain elements, modules, or systems of system 300, system 310, IP resolution server 320, campaign evaluation server 330, online media server 340, and/or online campaign server 350 can perform various procedures, processes, and/or activities. In other embodiments, the procedures, processes, and/or activities can be performed by other suitable elements, modules, or systems of system 300, system 310, IP resolution server 320, campaign evaluation server 330, online media server 340, and/or online campaign server 350. System 300, system 310, IP resolution server 320, campaign evaluation server 330, online media server 340, and/or online campaign server 350 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300, system 310, IP resolution server 320, campaign evaluation server 330, online media server 340, and/or online campaign server 350 described herein.

In many embodiments, system 310, IP resolution server 320, campaign evaluation server 330, online media server 340, and/or online campaign server 350 can each be a computer system, such as computer system 100 (FIG. 1), as described above, and can each be a single computer, a single server, or a cluster or collection of computers or servers, or a cloud of computers or servers. In other embodiments, a single computer system can host system 300, system 310, IP resolution server 320, campaign evaluation server 330, online media server 340, and/or online campaign server 350. Additional details regarding system 300, system 310, IP resolution server 320, campaign evaluation server 330, online media server 340, online campaign server 350, and/or user device 360 are described herein.

In some embodiments, system 310 and/or each of its elements and/or modules can be modules of computing instructions (e.g., software modules) stored at non-transitory computer readable media that operate on one or more processors. In these or other embodiments, system 310 and/or each of its elements and/or modules can be implemented in hardware or combination of hardware and software. In many embodiments, the operator and/or administrator of system 310 can manage system 310, the processor(s) of system 310, and/or the memory storage unit(s) of system 310 using the input device(s) and/or display device(s) of system 310.

In a number of embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

System 300, system 310, IP resolution server 320, campaign evaluation server 330, online media server 340, and/or online campaign server 350, and/or user device 360 can be implemented using any suitable manner of wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, system 310 can be in data communication, through computer network 380, with IP resolution server 320, campaign evaluation server 330, online media server 340, online campaign server 350, and/or user device 360. Computer network 380 can include one or more of a computer network, a telephone network, the Internet, and/or an internal network not open to the public (e.g., a private network and/or a virtual private network (VPN)), etc. The data communication between system 310 and any of IP resolution server 320, campaign evaluation server 330, online media server 340, online campaign server 350, and/or user device 360 can be encrypted, based on any suitable cryptographic techniques or modules (e.g., cryptographic modules implemented by hardware, firmware, and/or software of system 310 and validated by the Cryptographic Module Validation Program ("CMVP"), etc.).

Meanwhile, in many embodiments, system 310 also can be configured to communicate with one or more databases (e.g., database(s) 390). Examples of the one or more databases can include a patient database that contains information about patients including, for example, demographic information (e.g., age, race, gender, ethnicity, occupation, etc.), geographic information (e.g., the school district of the postal code of a patient's residence, etc.), social determinants of health (e.g., access to foods, education, income, water pollution in a consumer-patient's environment, etc.), behavioral and/or media preferences (e.g., social media usages, search engine preferences, etc.), and/or attitudinal personas (e.g., personas for a group of consumer-patients based on similar behavioral patterns in their purchasing decisions, use of products or services, customer service, etc.) which can be used to de-identify and tokenize at an individual level to ensure privacy and HIPAA compliance, among other information. Further, the one or more databases can include a medical/prescription claim database that contains information about medical or prescription claims submitted by medical practitioners or pharmacies to insurers for the services and/or drugs provided to patients. In several embodiments, the one or more databases also can include a media event log database that contains online website impression logs including internet addresses, timestamp data (e.g., dates and times of the impressions), impression or engagement types (e.g., clicks to watch, digital transactions, etc.), device identifiers (e.g., a universally unique identifier (UUID), a mobile device identifier, etc.), and/or campaign information (e.g., ad units served, site placements, etc.), among other information for online impressions. In many embodiments, the information (e.g., patient data, medical or prescription claims, etc.) stored in the database(s) (e.g., database(s) 390) can be encrypted by any suitable cryptographic algorithms, techniques, or CMVP-validated modules, etc.

In some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units. Further, the one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, RocksDB, and IBM DB2 Database.

In many embodiments, IP resolution server 320 can be configured to determine household internet addresses corresponding to household street addresses based at least in part on online website impression logs in a database (e.g., the media event log database described above). In a number of embodiments, online media server(s) 340 can host one or more publisher websites and/or mobile application servers that provide media advertisements to a user (e.g., user 370) via a user interface (e.g., a GUI 361, a mobile application, a web browser, or a chat application) on user device 360 for user 351. The media advertisements can include online advertisements (e.g., pop-up ads, search engine advertisements, etc.) targeting certain customers (e.g., existing or potential users of the advertised drugs and/or medical services, etc.). Further, online media server(s) 340 can be configured to provide online website impression logs for executed online advertising or marketing campaigns. In many embodiments, online campaign server 350 can be configured to manage and execute online marketing campaigns, including bidding and distributing ads among multiple media servers (e.g., online media server(s) 340), as an example. In some embodiments, campaign evaluation server 330 can be configured to generate performance indications of online marketing campaigns based at least in part on impression logs and/or aggregated patient health data (e.g., anonymized patient health and/or consumer attributes) for the online campaigns.

In some embodiments, user device 360 can be used by one or more users (e.g., user 370) to interface with system 310, IP resolution server 320, campaign evaluation server 330, online media server 340, and/or online campaign server 350. For example, user device 360 can, via various user interfaces (e.g., GUI 361, webpages or applications, etc.), transmit commands from user 370 (e.g., system administrators or operators) to system 310, IP resolution server 320, campaign evaluation server 330, online media server 340, and/or online campaign server 350, and receive responses and/or notices from IP resolution server 320, campaign evaluation server 330, online media server 340, and/or online campaign server 350 to be presented to user 370. User device 360 further can (a) receive, via a computer network (e.g., network 380), online advertisements from an online media server (e.g., online media server(s) 340); (b) display, via various user interfaces (e.g., GUI 361, webpages or applications, etc.), the online advertisements; and/or (c) transmit, via the computer network (e.g., network 380), impression data (e.g., views and/or clicks), if any, by the user (e.g., user 370) for the online advertisements to the online media server (e.g., online media server(s) 340).

In certain embodiments, user device 360 can be any one of desktop computers, laptop computers, mobile devices, and/or other endpoint devices used by one or more users (e.g., user 370). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For example, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

Turning ahead in the drawings, FIG. 4 illustrates a flow chart for a method 400 for providing privacy-law compliant consumer-patient data for target online marketing or advertising, according to an embodiment. In many embodiments, method 400 can be implemented via execution of computing instructions on one or more processors. Method 400 is merely exemplary and is not limited to the embodiments presented herein. Method 400 can be employed in many different embodiments or examples not specifically depicted or described herein. In some embodiments, the procedures, the processes, the activities, and/or the blocks of method 400 can be performed in the order presented. In other embodiments, the procedures, the processes, the activities, and/or the blocks of method 400 can be performed in any suitable order. In still other embodiments, one or more of the procedures, the processes, the activities, and/or the blocks of method 400 can be combined or skipped.

In many embodiments, system 300 (FIG. 3) and/or system 310 (FIG. 3) can be suitable to perform method 400 and/or one or more of the activities of method 400. In these or other embodiments, one or more of the activities of method 400 can be implemented as one or more computing instructions that can run on one or more processors and be stored at one or more non-transitory computer readable media. Such nontransitory computer readable media can be part of a computer system such as system 300 (FIG. 3) and/or system 310 (FIG. 3). The processor(s) can be similar or identical to the processor(s) described above with respect to computer system 100 (FIG. 1).

Referring to FIG. 4, in many embodiments, method 400 can include receiving a marketing campaign audience segment file for an online campaign in one or more target geographic areas (block 410). Block 410 can receive the marketing campaign audience segment file from a database (e.g., database(s) 390 (FIG. 3)) or via a computer network (e.g., network 380 (FIG. 3)) from a remote server. In some embodiments, the marketing campaign audience segment file can include a respective target area identifier for bijectively identifying each of the one or more target geographic areas where anonymous consumer-patients associated with one or more medical or prescription claim attributes for the online campaign reside. That is, a geographic area where a targeted anonymous patient resides can be uniquely identified by a target area identifier, and/or the target area identifier also can be uniquely mapped to the geographic area. In some embodiments, the respective target area identifier for bijectively identifying each target geographic area can include a 9-digit postal code for the each target geographic area. Additionally, in a number of embodiments, the marketing campaign audience segment file does not include any personal identifiable information for the anonymous patients.

In a number of embodiments, method 400 further can include generating marketing campaign audience internet address data based on the marketing campaign audience segment file received in block 410 (block 420). In several embodiments, generating the marketing campaign audience internet address data in block 420 can include determining a respective household street address for each of respective target households in each of the one or more target geographic areas (block 4210). In many embodiments, each target area of the one or more target geographic areas can include respective parcels of land. Each parcel of land of the each target area can include multiple respective geographic units (e.g., approximately 1-square-meter areas, approximately 100-square-feet areas, etc.) associated with respective household geographic coordinates in any suitable spatial reference systems (e.g., Geographic Coordinate System (GCS) coordinates, Universal Transverse Mercator (UTM) coordinates, Cartesian coordinates, etc.). Each parcel of land of the each target area also can be associated with one of the respective target households in the each target area.

In some embodiments, generating the marketing campaign audience internet address data in block 420 further can include determining a respective household internet address corresponding to the respective household street address based on online website impression logs provided, via the computer network (e.g., network 380 (FIG. 3)), by one or more online media servers (e.g., online media server(s) 340 (FIG. 3)) (block 4220). In certain embodiments, block 4220 further can include receiving, via the computer network (e.g., network 380 (FIG. 3)), the online website impression logs from the one or more online media servers, directly or indirectly through an online campaign server (e.g., online campaign server 350 (FIG. 3)). In several embodiments, determining the respective household internet address in block 4220 can be implemented partially or entirely by a system (e.g., system 300 (FIG. 3) or system 310 (FIG. 3)) and/or a remote server (e.g., IP resolution server 320 (FIG. 3)).

Still referring to FIG. 4, in a number of embodiments, determining the respective household internet address corresponding to the respective household street address in block 4220 can include: (a) determining a respective household identifier bijectively identifying the respective household street address (block 4221); and/or (b) receiving, via the computer network (e.g., network 380 (FIG. 3)), the respective household internet address associated with the respective household identifier from an internet address resolution server (e.g., IP resolution server 320 (FIG. 3)) (block 4222). The internet address resolution server can be configured to provide the respective household internet address determined based on the online website impression logs in any suitable way. Block 4221 can determine the respective household identifier by any suitable algorithms (e.g., Message Digest (MD) 5 hashing algorithm, Secure Hash Algorithm (SHA)-1 or SHA-2 hashing algorithm, etc.) to uniquely identify, directly or indirectly, the respective household street address, and/or the respective household street address can be uniquely linked to the respective household identifier determined in block 4221. In certain embodiments, the system (e.g., system 300 (FIG. 3) and/or system 310 (FIG. 3)) for implementing block 4220 and the internet address resolution server in block 4222 (e.g., IP resolution server 320 (FIG. 3)) can use the same algorithm for linking the respective household identifier and the respective household street address.

In some embodiments, where each online website impression log includes respective household geographic coordinates and a respective household internet address(es) corresponding to the respective household geographic coordinates, determining the respective household internet address corresponding to the respective household street address in block 4220 additionally or alternatively can include: (a) determining a parcel of land associated with the respective household street address; (b) determining the respective household geographic coordinates for the parcel of land; and/or (c) analyzing the online website impression logs to determine the respective household internet address(es) from at least one of the online website impression logs that includes the respective household geographic coordinates. As stated above, each parcel of land can be associated with a respective target household, a respective household street address(es), and/or respective household geographic coordinates. Accordingly, as long as the respective household geographic coordinates associated with the respective household street address can be found in at least one online website impression log, the respective household internet address corresponding to the respective household street address also can be determined from the at least one online website impression log.

In many embodiments, method 400 further can include transmitting, via the computer network (e.g., network 380 (FIG. 3)), the marketing campaign audience internet address data to an online campaign server (e.g., online campaign server 350 (FIG. 3)) for executing the online marketing campaign (block 430). Executing the online marketing campaign in block 430 can include bidding online advertisements through one or more media servers (e.g., online media server(s) 340 (FIG. 3)) based on the marketing campaign audience internet address data and/or the campaign's strategies and/or tactics, etc.

Turning ahead in the drawings, FIG. 5 illustrates a flow chart for a method 500 of determining a household internet address for a household street address, according to an embodiment. Method 500 can be an embodiment of block 4220 (FIG. 4). In many embodiments, method 500 can be implemented via execution of computing instructions on one or more processors. Method 500 is merely exemplary and is not limited to the embodiments presented herein. Method 500 can be employed in many different embodiments or examples not specifically depicted or described herein. In some embodiments, the procedures, the processes, the activities, and/or the blocks of method 500 can be performed in the order presented. In other embodiments, the procedures, the processes, the activities, and/or the blocks of method 500 can be performed in any suitable order. In still other embodiments, one or more of the procedures, the processes, the activities, and/or the blocks of method 500 can be combined or skipped.

In many embodiments, system 300 (FIG. 3) and/or system 310 (FIG. 3) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of a computer system such as system 300 (FIG. 3) and/or system 310 (FIG. 3). The processor(s) can be similar or identical to the processor(s) described above with respect to computer system 100 (FIG. 1). In a number of embodiments, one or more of the activities of method 500 can be similar or identical to any one or more of the activities (e.g., block 4220 (FIG. 4)) of method 400 (FIG. 4) as described above.

Referring to FIG. 5, in some embodiments, method 500 can include determining a parcel of land associated with a household street address (block 510). In many embodiments, each parcel of land of a target area for an online marketing campaign can be associated with a target household in the target area. As such, the respective household street address of a target household can be used to determine the parcel of land.

In several embodiments, method 500 further can include determining the household geographic coordinates for the parcel of land determined in block 510 (block 520). A parcel of land can include multiple respective geographic units (e.g., meter square areas) associated with household geographic coordinates for a target household. Accordingly, once the parcel of land for the household street address is determined in block 510, the household geographic coordinates for the parcel of land can be determined.

In a number of embodiments, method 500 additionally can include analyzing online website impression logs to determine the household internet address from at least one log of the online website impression logs (block 530). Each online website impression log can include respective household geographic coordinates, a respective household internet address, a respective timestamp, a respective device identifier, and/or respective campaign information etc. for an impression. When the online website impression logs include at least one log for the household geographic coordinates determined in block 520, block 530 can determine the household internet address from the at least one log.

In many embodiments, when the online website impression logs include multiple logs of different timestamps for the same anonymous consumer-patient or the same "household", each of the multiple logs can include different values of the household geographic coordinates and the household internet addresses. For example, the location (e.g., the household geographic coordinates) and the internet address (e.g., the household internet address) of an anonymous patient's mobile device in each of the multiple logs can vary at a different time. In some embodiments, analyzing the online website impression logs to determine the household internet address in block 530 can include evaluating consistency over time for internet addresses and location data in the online website impression logs based on timestamp data in the online website impression logs (block 5310). When the internet addresses and location data corresponding to a device (e.g., patient's mobile phone) in the online website impression logs are inconsistent, block 530 can determine the household internet address based on any suitable algorithms, methods, or models (e.g., exponential/recency-weighted average, simple moving average (SMA), etc.)

In a number of embodiments, analyzing the online website impression logs in block 530 additionally or alternatively can include evaluating federations between one or more devices (e.g., user device 360 (FIG. 3)) based on one or more device identifiers (e.g., a UUID, etc.) for the one or more devices and the household geographic coordinates for the household street address in the online website impression logs (block 5320). For example, multiple devices (e.g., user device 360 (FIG. 3), personal computers, and/or mobile devices, etc.) for one or more users (e.g., user 370 (FIG. 3), a targeted consumer-patient, and/or the targeted consumer-patient's family members, etc.) can be linked to the same internet addresses and the same household street address in the online website impression logs.

Turning ahead in the drawings, FIG. 6 illustrates a flow chart for a method 600 for determining a household internet address based on a household street address, according to an embodiment, according to another embodiment. Method 600 can be an embodiment of block 4220 (FIG. 4). Method 600 is merely exemplary and is not limited to the embodiments presented herein. Method 600 can be employed in many different embodiments or examples not specifically depicted or described herein. In some embodiments, the procedures, the processes, the activities, and/or the blocks of method 600 can be performed in the order presented. In other embodiments, the procedures, the processes, the activities, and/or the blocks of method 600 can be performed in any suitable order. In still other embodiments, one or more of the procedures, the processes, the activities, and/or the blocks of method 600 can be combined or skipped.

In many embodiments, system 300 (FIG. 3) and/or system 310 (FIG. 3) (including the elements and/or modules thereof) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer readable media. Such non-transitory computer readable media can be part of a computer system such as system 300 (FIG. 3) and/or system 310 (FIG. 3) (including the modules). The processor(s) can be similar or identical to the processor(s) described above with respect to computer system 100 (FIG. 1).

Referring to FIG. 6, in many embodiments, method 600 can include determining a respective household identifier bijectively identifying the respective household street address (block 610). Block 610 can generate the respective household identifier by any suitable algorithms or methods (e.g., MD-5 hashing algorithm, SHA-1 or SHA-2 hashing algorithm, etc.) to uniquely identify, directly or indirectly, the respective household street address, and the respective household street address can be uniquely linked to the respective household identifier determined in block 610.

In some embodiments, method 600 further can include receiving, via the computer network (e.g., network 380 (FIG. 3)), the respective household internet address associated with the respective household identifier from an internet address resolution server (e.g., IP resolution server 320 (FIG. 3)) configured to provide the respective household internet address determined based on the online website impression logs (block 620). For example, the internet address resolution server can be configured to receive, via the computer network (e.g., network 380 (FIG. 3)), the respective household identifier from a system (e.g., system 300 (FIG. 3) or system 310 (FIG. 3)); analyze the online website impression logs to determine the respective household internet address associated with the respective household identifier; and transmit, via the computer network, to the system. The internet address resolution server can determine the respective household internet address in any suitable way that can be similar to or different from method 500 (FIG. 5).

Turning ahead in the drawings, FIG. 7 illustrates a flow chart for a method 700 for linking impression logs for an online campaign to tokenized consumer-patient information for post campaign analysis, according to an embodiment. Method 700 is merely exemplary and is not limited to the embodiments presented herein. Method 700 can be employed in many different embodiments or examples not specifically depicted or described herein. In some embodiments, the procedures, the processes, the activities, and/or the blocks of method 700 can be performed in the order presented. In other embodiments, the procedures, the processes, the activities, and/or the blocks of method 700 can be performed in any suitable order. In still other embodiments, one or more of the procedures, the processes, the activities, and/or the blocks of method 700 can be combined or skipped.

In many embodiments, system 300 (FIG. 3) and/or system 310 (FIG. 3) can be suitable to perform method 700 and/or one or more of the activities of method 700. In these or other embodiments, one or more of the activities of method 700 can be implemented as one or more computing instructions configured to run at one or more processors and configured to be stored at one or more non-transitory computer readable media. Such non-transitory computer readable media can be part of a computer system such as system 300 (FIG. 3) and/or system 310 (FIG. 3) (including the modules). The processor(s) can be similar or identical to the processor(s) described above with respect to computer system 100 (FIG. 1).

Referring to FIG. 7, method 700 can include receiving impression logs for the online campaign (block 710). In some embodiments, the impression logs can be received, via the computer network (e.g., network 380 (FIG. 3)), from one or more online media servers (e.g., online media server(s) 340 (FIG. 3)), directly or indirectly through an online campaign server (e.g., online campaign server 350 (FIG. 3)). The impression logs can include impression internet addresses, among other things.

In a number of embodiments, method 700 further can include determining a respective impression street address for each of the impression internet addresses of the impression logs (block 720). In some embodiments, determining the respective impression street address for each impression internet address in block 720 further can include analyzing the impression logs to determine each impression internet address from at least one log of the impression logs. The at least one log of the impression logs can include the each impression internet address and respective impression geographic coordinates in the one or more target geographic areas for the online campaign. Each target area of the one or more target geographic areas can include respective parcels of land, and each of the respective parcels of land can include multiple respective geographic units (e.g., meter-square areas, etc.) associated with respective household geographic coordinates (e.g., GPS coordinates, Cartesian coordinates etc.).

In several embodiments, block 720 additionally can include determining a parcel of land for the respective impression geographic coordinates from the respective parcels of land of each of the target geographic areas. Each of the respective parcels of land of the each target area can be bijectively associated with a target household of the respective target households (and a target household street address corresponding to the target household) in the each target area. Accordingly, with the parcel of land determined, the respective impression street address associated with the parcel of land can be identified.

In a number of embodiments, method 700 further can include determining a respective impression household identifier bijectively identifying the respective impression street address for each of the impression internet addresses (block 730). Determining the respective impression household identifier in block 730 can be similar or identical to block 4221 (FIG. 4) and/or block 610 (FIG. 6). For example, the respective impression household identifier can be generated by any suitable algorithm (e.g., MD-5 or SHA-1 hashing, etc.) based on at least one of: the respective impression street address, the unique impression internet address for the respective impression street address, or the respective impression geographic coordinates associated with the parcel of land for the respective impression street address.

Still referring to FIG. 7, in a number of embodiments, method 700 further can include determining one or more respective patient identifiers associated with the respective impression household identifier (block 740). In many embodiments, block 740 can determine the one or more respective patient identifiers associated with the respective impression household identifier based on any suitable methods (e.g., block 5320 (FIG. 5)). In certain embodiments, the association between the one or more respective patient identifiers and the respective impression household identifier can be stored in a database (e.g., database(s) 390 (FIG. 3)) accessible to a system implementing block 740 (e.g., system 300 (FIG. 3) or system 310 (FIG. 3)) or a remote server that is configured to transmit the one or more respective patient identifiers to the system implementing block 740.

In many embodiments, method 700 additionally can include retrieving patient health data for anonymous responding patients associated with the one or more respective patient identifiers for each of the impression internet addresses (block 750). The patient health data in block 750 can be retrieved or received, via the computer network (e.g., network 380 (FIG. 3)), from one or more remote servers and/or remote databases (e.g., database(s) 390 (FIG. 3)). The remote server(s) or database(s) can be similar to or different from the source of the marketing campaign audience segment file used in method 400 (FIG. 4). In a number of embodiments, the patient health data can include any information suitable for the post campaign analysis, such as demographic data, geographic data, behavior data, and/or de-identified and tokenized medical or prescription claim data (e.g., the diagnostics, prescribed medicines, or medical services received, etc.) that are associated with the anonymous responding patients.

In some embodiments, method 700 further can include generating an aggregated patient health data file based on the patient health data (block 760). In a number of embodiments, generating the aggregated patient health data file in block 760 can include aggregating the patient health data into the patient health and consumer attributes in the aggregated patient health data file so that the aggregated patient health data file does not include any personal identifiable information for the anonymous responding patients. For example, although the patients responding to an online campaign are anonymous in the patient health data received in block 750, if it is still possible that some of the patient health data (e.g., the occupation, the diagnostics in the medical or prescription claims, etc.), individually or as a whole, can be used to identify certain patients, block 760 in certain embodiments can further abstract or anonymize such patient health data, using any suitable Safe Harbor techniques, before adding or combining the patient health data into the aggregated patient health data file.

In several embodiments, method 700 also can include transmitting, via the computer network (e.g., network 380 (FIG. 3)), the impression logs and the aggregated patient health data file for the online campaign to a campaign evaluation server (e.g., campaign evaluation server 330 (FIG. 3)) for generating performance indications of the online campaign (block 770).

Various embodiments can include a system for providing privacy-law compliant consumer-patient information (e.g., internet addresses for anonymous consumer-patients) for target online marketing. The system can include one or more processors and one or more non-transitory computer-readable media storing computing instructions that, when executed on the one or more processors, cause the one or more processors to perform various acts. In many embodiments, the acts can include receiving, via a computer network, a marketing campaign audience segment file for an online campaign in one or more target geographic areas. In a number of embodiments, the acts further can include generating marketing campaign audience internet address data based on a marketing campaign audience segment file. In certain embodiments, the act of generating marketing campaign audience internet address data can include: (a) determining a respective household street address for each of respective target households in each of the one or more target geographic areas; and (b) determining a respective household internet address corresponding to the respective household street address based on online website impression logs provided, via the computer network, by one or more online media servers. In several embodiments, the acts further can include transmitting, via the computer network, the marketing campaign audience internet address data to an online campaign server for executing the online marketing campaign. Further, various embodiments can include a method being implemented via execution of computing instructions configured to run at one or more processors and stored at one or more non-transitory computer-readable media. The method can include one or more acts performed in the system above. For example, the method can include receiving, via a computer network, a marketing campaign audience segment file for an online campaign in one or more target geographic areas. The method further can include generating marketing campaign audience internet address data based on a marketing campaign audience segment file. In some embodiments, generating marketing campaign audience internet address data further can include: (a) determining a respective household street address for each of respective target households in each of the one or more target geographic areas; and (b) determining a respective household internet address corresponding to the respective household street address based on online website impression logs provided, via the computer network, by one or more online media servers. In several embodiments, the method also can include transmitting, via the computer network, the marketing campaign audience internet address data to an online campaign server for executing the online marketing campaign.

In many embodiments, the techniques described herein can provide a practical application and several technological improvements. The techniques described herein can provide technological improvements to identity resolution solutions based on protected health information that is stripped of identifying features in compliance with privacy laws. Specifically, the techniques disclosed here can provide accurate and secured linkage between each household in a targeted neighborhood (e.g., the neighborhood of a target consumer-patient) and one or more household internet addresses for the each household, for commercial use (e.g., the planning, development, execution, and/or performance measurement of an online marketing campaign). These techniques described herein can provide a significant improvement over conventional online marketing approaches in healthcare that fail to provide satisfying customer segmentation and accurate and secured linkage between prospective consumer-patients and their internet addresses, which can result in ineffective online marketing campaigns and potential leakage of protected health information as prohibited by privacy-related laws and/or regulations.

Further, in many embodiments, the techniques described herein can provide technological improvements to identity resolution solutions by not using any cookies to track and store personal information. These cookie-less techniques described herein can provide additional significant improvements over conventional cookie-based online marketing approaches in healthcare whose use of cookies causes privacy concerns and security risks and/or that cannot correctly identify prospective consumer-patients when cookies are blocked.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although providing privacy-law compliant consumer-patient information (e.g., internet addresses and/or tokenized consumer-patient data) for target online marketing, including targeted advertising and post-campaign analysis, have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. Different functions, algorithms, models, models, and/or systems may be used to anonymize and/or encrypt the consumer-patient data, analyze online website impression logs, and/or link household street addresses to household internet addresses, etc. Further, the activities in method 400 (FIG. 4), method 500 (FIG. 5), method 600 (FIG. 6), and/or method 700 (FIG. 7) that include retrieving protected health information from a database and/or receiving/transmitting protected health information via a computer network further can include encrypting/decrypting the protected health information, when needed.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions that, when run on the one or more processors, cause the one or more processors to perform:

receiving, via a computer network, a marketing campaign audience segment file for an online marketing campaign in one or more target geographic areas, wherein the marketing campaign audience segment file is anonymized and includes a respective target area identifier for bijectively identifying each of the one or more target geographic areas where anonymous patients reside, and the marketing campaign audience segment file does not include any personal identifiable information for the anonymous patients;

generating a secure link between households in the one or more target geographic areas and marketing campaign audience internet address data based on the marketing campaign audience segment file, comprising:

determining a respective household street address for each of respective target households in each of the one or more target geographic areas;

determining, using a hashing or encryption algorithm, an anonymized respective household identifier bijectively identifying the respective household street address, wherein the anonymized respective household identifier is hashed or encrypted, and wherein the anonymized respective household identifier uniquely identifies the respective household street address; and determining a respective household internet address corresponding to the respective household street address based on online website impression logs provided, via the computer network, by one or more online media servers, wherein the online website impression logs include internet addresses, timestamp data, and device identifiers, by:

receiving, via the computer network, the respective household internet address associated with the anonymized respective household identifier from an internet address resolution server configured to provide the respective household internet address determined based on the online website impression logs, wherein the internet address resolution server analyzes the online website impression logs to determine the respective household internet address associated with the anonymized respective household identifier from at least one log of the online website impression logs; and transmitting, via the computer network, the marketing campaign audience internet address data to an online campaign server for executing the online marketing campaign.

2. The system in claim 1, wherein:

the anonymous patients are associated with one or more medical or prescription claim attributes for the online marketing campaign; and the respective target area identifier for bijectively identifying each of the one or more target geographic areas comprises a 9-digit postal code.

3. The system in claim 2, wherein:

each of the one or more target geographic areas comprises respective parcels of land;

each of the respective parcels of land of each of the one or more target geographic areas comprises multiple respective geographic units associated with respective household geographic coordinates; and each of the respective parcels of land of each of the one or more target geographic areas is associated with one of the respective target households in the each of the one or more target geographic areas.

4. The system in claim 3, wherein determining the respective household internet address for the respective household street address further comprises:

determining a parcel of land associated with the respective household street address;

determining the respective household geographic coordinates for the parcel of land; and analyzing the online website impression logs to determine the respective household internet address from at least one log of the online website impression logs, wherein the at least one log comprises the respective household geographic coordinates and the respective household internet address.

5. The system in claim 4, wherein analyzing the online website impression logs further comprises one or more of:

evaluating consistency over time for internet addresses and location data in the online website impression logs based on timestamp data in the online website impression logs; or evaluating respective federations between one or more respective devices based on one or more respective device identifiers for the one or more respective devices and the respective household geographic coordinates for the respective household street address in the online website impression logs.

6. The system in claim 1, wherein the computing instructions, when run on the one or more processors, further cause the one or more processors to perform:

receiving, via the computer network, impression logs for the online marketing campaign, wherein the impression logs comprise impression internet addresses;

determining a respective impression street address for each of the impression internet addresses of the impression logs;

determining a respective impression household identifier bijectively identifying the respective impression street address for each of the impression internet addresses;

determining one or more respective patient identifiers associated with the respective impression household identifier;

retrieving, via the computer network, patient health data for anonymous responding patients associated with the one or more respective patient identifiers for each of the impression internet addresses;

generating an aggregated patient health data file based on the patient health data; and transmitting, via the computer network, the impression logs and the aggregated patient health data file for the online marketing campaign to a campaign evaluation server for generating performance indications of the online marketing campaign.

7. The system in claim 6, wherein:

each of the one or more target geographic areas comprises respective parcels of land;

each of the respective parcels of land of each of the one or more target geographic areas comprises multiple respective geographic units associated with respective household geographic coordinates; and each of the respective parcels of land of each of the one or more target geographic areas is bijectively associated with one of the respective target households in the each of the one or more target geographic areas.

8. The system in claim 7, wherein determining the respective impression street address for each impression internet address of the impression internet addresses further comprises:

analyzing the impression logs to determine the each impression internet address from at least one log of the impression logs, wherein the at least one log comprises the each impression internet address and respective impression geographic coordinates in the one or more target geographic areas; and determining a parcel of land for the respective impression geographic coordinates from the respective parcels of land of each of the target geographic areas, wherein the respective impression street address is associated with the parcel of land, as determined.

9. The system in claim 6, wherein generating the aggregated patient health data file further comprises:

aggregating the patient health data into patient health and consumer attributes in the aggregated patient health data file so that the aggregated patient health data file does not include any personal identifiable information for the anonymous responding patients.

10. A method being implemented via execution of computing instructions configured to run at one or more processors and stored at one or more non-transitory computer-readable media, the method comprising:

receiving, via a computer network, a marketing campaign audience segment file for an online marketing campaign in one or more target geographic areas, wherein the marketing campaign audience segment file is anonymized and includes a respective target area identifier for bijectively identifying each of the one or more target geographic areas where anonymous patients reside, and the marketing campaign audience segment file does not include any personal identifiable information for the anonymous patients;

generating a secure link between households in the one or more target geographic areas and marketing campaign audience internet address data based on the marketing campaign audience segment file, comprising:

determining a respective household street address for each of respective target households in each of the one or more target geographic areas;

determining, using a hashing or encryption algorithm, an anonymized respective household identifier bijectively identifying the respective household street address, wherein the anonymized respective household identifier is hashed or encrypted, and wherein the anonymized respective household identifier uniquely identifies the respective household street address;

determining a respective household internet address corresponding to the respective household street address based on online website impression logs provided, via the computer network, by one or more online media servers, wherein the online website impression logs include internet addresses, timestamp data, and device identifiers, by:

receiving, via the computer network, the respective household internet address associated with the anonymized respective household identifier from an internet address resolution server configured to provide the respective household internet address determined based on the online website impression logs, wherein the internet address resolution server analyzes the online website impression logs to determine the respective household internet address associated with the anonymized respective household identifier from at least one log of the online website impression logs; and transmitting, via the computer network, the marketing campaign audience internet address data to an online campaign server for executing the online marketing campaign.

11. The method in claim 10, wherein:

the anonymous patients are associated with one or more medical or prescription claim attributes for the online marketing campaign;

the respective target area identifier for bijectively identifying each of the one or more target geographic areas comprises a 9-digit postal code.

12. The method in claim 11, wherein:

each of the one or more target geographic areas comprises respective parcels of land;

each of the respective parcels of land of each of the one or more target geographic areas comprises multiple respective geographic units associated with respective household geographic coordinates; and each of the respective parcels of land of each of the one or more target geographic areas is associated with one of the respective target households in the each of the one or more target geographic areas.

13. The method in claim 12, wherein determining the respective household internet address for the respective household street address further comprises:

determining a parcel of land associated with the respective household street address;

determining the respective household geographic coordinates for the parcel of land; and analyzing the online website impression logs to determine the respective household internet address from at least one log of the online website impression logs, wherein the at least one log comprises the respective household geographic coordinates and the respective household internet address.

14. The method in claim 13, wherein analyzing the online website impression logs further comprises one or more of:

evaluating consistency over time for internet addresses and location data in the online website impression logs based on timestamp data in the online website impression logs; or evaluating respective federations between one or more respective devices based on one or more respective device identifiers for the one or more respective devices and the respective household geographic coordinates for the respective household street address in the online website impression logs.

15. The method in claim 10, further comprising:

receiving, via the computer network, impression logs for the online marketing campaign, wherein the impression logs comprise impression internet addresses;

determining a respective impression street address for each of the impression internet addresses of the impression logs;

determining a respective impression household identifier bijectively identifying the respective impression street address for each of the impression internet addresses;

determining one or more respective patient identifiers associated with the respective impression household identifier;

retrieving, via the computer network, patient health data for anonymous responding patients associated with the one or more respective patient identifiers for each of the impression internet addresses;

generating an aggregated patient health data file based on the patient health data; and transmitting, via the computer network, the impression logs and the aggregated patient health data file for the online marketing campaign to a campaign evaluation server for generating performance indications of the online marketing campaign.

16. The method in claim 15, wherein:

each of the one or more target geographic areas comprises respective parcels of land;

each of the respective parcels of land of each of the one or more target geographic areas comprises multiple respective geographic units associated with respective household geographic coordinates; and each of the respective parcels of land of each of the one or more target geographic areas is bijectively associated with one of the respective target households in the each of the one or more target geographic areas.

17. The method in claim 16, wherein determining the respective impression street address for each impression internet address of the impression internet addresses further comprises:

analyzing the impression logs to determine the each impression internet address from at least one log of the impression logs, wherein the at least one log comprises the each impression internet address and respective impression geographic coordinates in the one or more target geographic areas; and determining a parcel of land for the respective impression geographic coordinates from the respective parcels of land of each of the target geographic areas, wherein the respective impression street address is associated with the parcel of land, as determined.

18. The method in claim 15, wherein generating the aggregated patient health data file further comprises:

aggregating the patient health data into patient health and consumer attributes in the aggregated patient health data file so that the aggregated patient health data file does not include any personal identifiable information for the anonymous responding patients.

* * * * *